(12) United States Patent
Iaquaniello et al.

(10) Patent No.: US 9,932,229 B2
(45) Date of Patent: Apr. 3, 2018

(54) METHOD AND SYSTEM FOR PRODUCTION OF HYDROGEN RICH GAS MIXTURES

(75) Inventors: Gaetano Iaquaniello, Rome (IT); Emma Palo, Rome (IT); Palma Contaldo, Rome (IT)

(73) Assignee: STAMICARBON B.V., Sittard (NL)

( * ) Notice: Subject to any disclaimer, the term of this patent is extended or adjusted under 35 U.S.C. 154(b) by 169 days.

(21) Appl. No.: 14/235,020

(22) PCT Filed: Jul. 26, 2012

(86) PCT No.: PCT/NL2012/050533
§ 371 (c)(1),
(2), (4) Date: Mar. 31, 2014

(87) PCT Pub. No.: WO2013/015687
PCT Pub. Date: Jan. 31, 2013

(65) Prior Publication Data
US 2014/0291581 A1    Oct. 2, 2014

(30) Foreign Application Priority Data
Jul. 26, 2011    (EP) .................................... 11175356

(51) Int. Cl.
*C01B 3/38*    (2006.01)
*C01B 3/48*    (2006.01)
(Continued)

(52) U.S. Cl.
CPC .............. *C01B 3/382* (2013.01); *C01B 3/384* (2013.01); *C01B 3/48* (2013.01); *C01B 3/501* (2013.01);
(Continued)

(58) Field of Classification Search
CPC ..................................................... C01B 3/382
See application file for complete search history.

(56) References Cited

U.S. PATENT DOCUMENTS

| | | | |
|---|---|---|---|
| 4,792,441 A | 12/1988 | Wang et al. | |
| 4,886,651 A * | 12/1989 | Patel et al. .................... | 423/359 |

(Continued)

FOREIGN PATENT DOCUMENTS

| | | |
|---|---|---|
| EP | 2 233 432 | 9/2010 |
| WO | WO-00/78443 | 12/2000 |

(Continued)

OTHER PUBLICATIONS

Re-submission of EP 2233432 (2010).*
International Search Report for PCT/NL2012/050533, dated Oct. 31, 2012, 3 pages.

*Primary Examiner* — Paul A Wartalowicz
(74) *Attorney, Agent, or Firm* — Morrison & Foerster LLP

(57) ABSTRACT

The present invention relates to a process for producing a hydrogen containing gas mixture comprising the following steps: (i) providing a preheated mixture comprising a fossil fuel, preferably methane, and steam, (ii) conducting an adiabatic reaction between the fossil fuel and the steam, in the presence of a catalyst, wherein a first reaction product mixture is formed comprising methane, hydrogen and carbon dioxide, and (iii) conducting an oxygen-assisted reforming reaction in the presence of a catalyst between said first reaction product mixture and an oxygen comprising stream, wherein the oxygen comprising stream comprises at least 40 vol % oxygen, forming a second reaction product mixture comprising hydrogen and carbon monoxide. The invention also relates to a system suitable for hydrogen production from a hydrocarbon feed according to the present invention.

14 Claims, 1 Drawing Sheet

(51) Int. Cl.
  *C01B 3/50* (2006.01)
  *C01B 3/56* (2006.01)

(52) U.S. Cl.
  CPC ........ *C01B 3/56* (2013.01); *C01B 2203/0233* (2013.01); *C01B 2203/0244* (2013.01); *C01B 2203/0261* (2013.01); *C01B 2203/0283* (2013.01); *C01B 2203/043* (2013.01); *C01B 2203/0405* (2013.01); *C01B 2203/061* (2013.01); *C01B 2203/062* (2013.01); *C01B 2203/068* (2013.01); *C01B 2203/0883* (2013.01); *C01B 2203/0888* (2013.01); *C01B 2203/0894* (2013.01); *C01B 2203/107* (2013.01); *C01B 2203/1023* (2013.01); *C01B 2203/1029* (2013.01); *C01B 2203/1047* (2013.01); *C01B 2203/1052* (2013.01); *C01B 2203/1058* (2013.01); *C01B 2203/1064* (2013.01); *C01B 2203/1076* (2013.01); *C01B 2203/1082* (2013.01); *C01B 2203/1235* (2013.01); *C01B 2203/1241* (2013.01); *C01B 2203/1258* (2013.01); *C01B 2203/142* (2013.01)

(56) References Cited

U.S. PATENT DOCUMENTS

| | | | |
|---|---|---|---|
| 5,741,474 A * | 4/1998 | Isomura et al. | 423/648.1 |
| 6,375,916 B2 | 4/2002 | Christensen et al. | |
| 7,261,751 B2 | 8/2007 | Dutta et al. | |
| 7,569,085 B2 | 8/2009 | Kumar et al. | |
| 2001/0051662 A1 | 12/2001 | Arcuri et al. | |
| 2003/0134911 A1 | 7/2003 | Schanke et al. | |
| 2006/0057060 A1 | 3/2006 | Sun et al. | |
| 2006/0292066 A1 * | 12/2006 | Pez | C01B 3/38 423/648.1 |
| 2008/0000350 A1 * | 1/2008 | Mundschau et al. | 95/56 |
| 2008/0262110 A1 * | 10/2008 | Lomax et al. | 518/704 |
| 2009/0108238 A1 * | 4/2009 | Wagner | B01J 23/40 252/373 |

FOREIGN PATENT DOCUMENTS

| | | |
|---|---|---|
| WO | WO-2006/097440 | 9/2006 |
| WO | WO-2006/117499 | 11/2006 |
| WO | WO-2011/072877 | 6/2011 |

\* cited by examiner

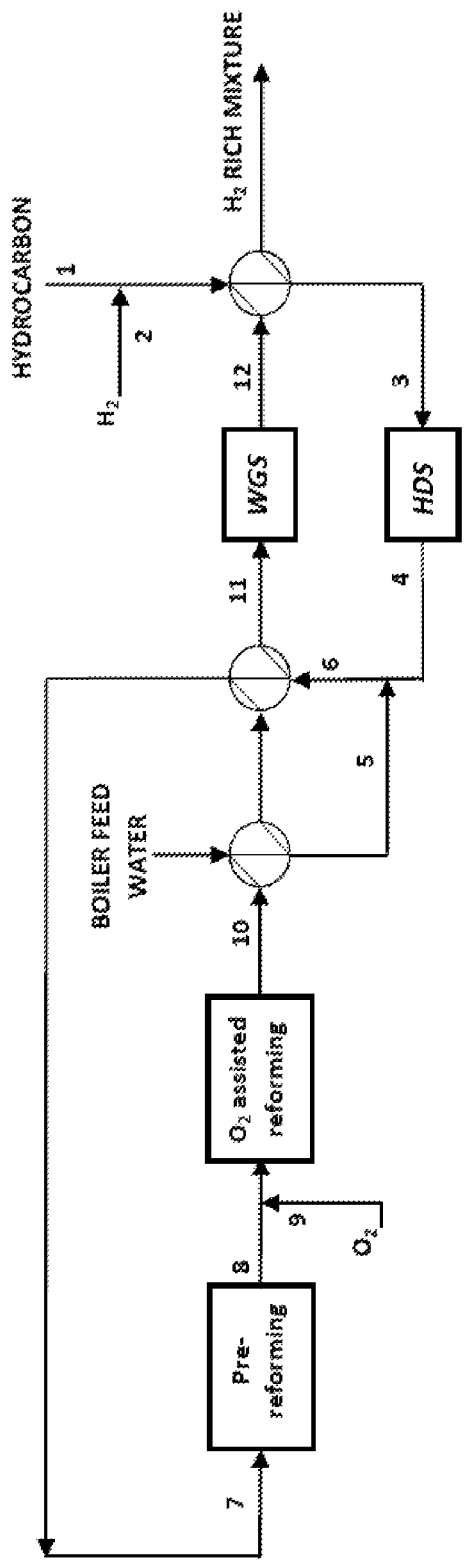

METHOD AND SYSTEM FOR PRODUCTION OF HYDROGEN RICH GAS MIXTURES

CROSS-REFERENCE TO RELATED APPLICATIONS

This application is the national phase of PCT application PCT/NL2012/050533 having an international filing date of 26 Jul. 2012, which claims benefit of European patent application No. 11175356.2 filed 26 Jul. 2011. The contents of the above patent applications are incorporated by reference herein in their entirety.

FIELD OF THE INVENTION

The invention relates to the field of production of hydrogen rich gas mixtures such as synthesis gas and, more particularly, to the production of hydrogen and hydrogen containing mixtures by steam reforming of hydrocarbon feedstock.

BACKGROUND OF THE INVENTION

Steam reforming is a well known method to generate mixtures of hydrogen and carbon monoxide from light hydrocarbon feeds, which can be used, in turn, for methanol synthesis or Fischer-Tropsch process, or further for hydrogen production. Due to the strong endothermicity, the steam reforming reaction needs to be carried out at a high reaction temperature (>750° C.), and is usually performed by supplying heat to a mixture of steam and a hydrocarbon feed in contact with a suitable catalyst, typically nickel based. The catalyst is usually contained in tubes, which are placed inside a furnace that is heated by combustion of fuel, thus supplying the reforming reaction heat.

Owing to the high energy intensive character of the steam reforming process, the hydrogen production industry has been driven to improve its thermal efficiency. It is known that the thermal efficiency is improved when the overall steam to carbon molar ratio is reduced. However one of the technical barriers for decreasing this ratio to values lower than 2.0 is that carbon (or coke or soot) would form on the reforming catalyst, especially in a top-fired reformer. Carbon formation must be prevented for two main reasons: (i) its deposition on the active sites of the catalyst leads to deactivation; (ii) the carbon deposits growth can cause total blockage of the reformer tubes, resulting in the development of hot spots and overheating of the tubes.

In spite of the widespread character of the steam reforming technology it still shows several disadvantages, in particular related to its high energy intensive character and the substantial amount of greenhouse gases (GHG) emitted, such as $CO_2$, during the burning of a part of methane feedstock in order to sustain the global endothermic balance of the steam reforming reaction.

One approach to overcome, at least partially, the mentioned drawbacks is to use autothermal reforming instead of steam reforming. Autothermal reforming (ATR) is a combination of partial oxidation and steam reforming wherein the exothermic heat of the partial oxidation supplies the necessary heat for the endothermic steam reforming reaction. This is typically carried out in a conventional, two-zone ATR reactor. In the first zone, which is typically provided with a burner, the feed is partially oxidized with oxygen or air, wherein most, if not all, of the molecular oxygen is consumed. The heat release from the oxidation reaction can raise the gas temperature as high as 1200-1300° C. The oxidation reaction is often carried out in an open volume, free of any catalyst. The hot gases then flow through a bed of reforming catalyst where the endothermic reaction between the unconverted hydrocarbons and water results in a mixture containing CO and $H_2$ at a desired ratio.

Use of autothermal reforming is known, for example, from U.S. Pat. No. 6,375,916 B2. This publication is directed to soot free autothermal reforming of hydrocarbon feed containing higher hydrocarbons. The system comprises a pre-reformer upstream of an autothermal reformer. The autothermal reforming is carried out in a burner combustion zone and, subsequently, in a catalytic zone having a fixed bed of steam reforming catalyst. In the burner combustion zone, where thermal reactions occur, the possibility of coke formation cannot be excluded.

WO 00/78443 A1 discloses a method for generating a pure hydrogen stream for use in fuel cells. The hydrogen generation zone is provided with: (i) a pre-reforming zone; (ii) a partial oxidation zone; (iii) a reforming zone; and (iv) a water gas shift zone. The partial oxidation and the steam reforming zones are physically separated but remain in thermal contact. Also, air is fed to the partial oxidation reactor to ensure that the overall plant operating temperature is not higher than 700° C.

WO 2006/097440 A1 discloses a process for hydrogen production comprising the steps of: (i) pre-reforming of a hydrocarbon feedstock; (ii) heating of the mixture to a temperature higher than 650° C.; (iii) non catalytic partial oxidation by contacting with a source of oxygen. The non catalytic partial oxidation is performed in order to reduce the consumption of oxygen.

US 2006/0057060 A1 discloses a method for producing synthesis gas from hydrocarbons comprising: (i) a pre-reforming step; (ii) an oxidative reforming step in a catalytic ceramic membrane reactor equipped with a membrane for oxygen separation from air; (iii) steps of preheating of various process streams. The membrane based separation of oxygen from air allows to use low pressure air as an oxygen source instead of pressurised high purity oxygen which is associated with high costs.

US 2001/0051662 discloses a pre-reformer used in order to reduce the content of higher hydrocarbons in natural gas. The resulting mixture is then converted to a synthesis gas with a 2:1 $H_2$:CO ratio and without significant soot formation in a conventional autothermal reformer. The synthesis gas is further used to produce higher hydrocarbons in a Fischer-Tropsch process.

Despite all that is known, the main drawbacks of the existing technology are (i) a higher reaction temperature to be employed to obtain a sustainable hydrocarbon conversion while affecting the selectivity to hydrogen and carbon monoxide; (ii) the presence of a burner combustion zone where carbon formation may occur.

Therefore it is desired to provide a process for the catalytic conversion of hydrocarbon feedstock with a high degree of feed flexibility and decreased soot formation, which at the same time provides an increase of the thermal efficiency of the overall process and hydrogen production and also a reduction in plant size due to the absence of burners for the catalytic conversion reaction.

SUMMARY OF THE INVENTION

In order to better address one or more of the foregoing desires, the invention presents, in one aspect, a process for producing a hydrogen containing gas mixture comprising the following steps:

(i) providing a preheated mixture comprising a fossil fuel, preferably methane, and steam, (ii) conducting an adiabatic reaction between the fossil fuel and the steam, in the presence of a catalyst, wherein a first reaction product mixture is formed comprising methane, hydrogen and carbon dioxide, and (iii) conducting an oxygen-assisted reforming reaction in the presence of a catalyst between said first reaction product mixture and an oxygen comprising stream, wherein the oxygen comprising stream comprises at least 40 vol % oxygen and wherein a second reaction product mixture is formed comprising hydrogen and carbon monoxide.

The invention, in another aspect, relates to a system suitable for hydrogen production from a hydrocarbon feed, comprising a hydrodesulphurising unit (HDS) for removal of sulphur compounds from the hydrocarbon feed, which unit is coupled to an adiabatic pre-reformer for converting the desulphurised feed and steam into a first reaction product mixture comprising methane, hydrogen and carbon dioxide, which pre-reformer is coupled to a catalytic reactor for catalytic oxygen-assisted reforming of the first reaction product mixture, which catalytic reactor is also provided with an inlet for an oxygen comprising gas and an outlet for a resulting second reaction product mixture comprising hydrogen and carbon monoxide, wherein the catalytic reactor is coupled to a heat exchanger for cooling the synthesis gas, which heat exchanger is coupled to a water gas shift (WGS) reactor, which shift reactor has an outlet for a third reaction product mixture comprising hydrogen.

BRIEF DESCRIPTION OF THE DRAWINGS

FIG. 1 shows a schematic representation of a preferred embodiment of the invention wherein a single pre-reforming stage is followed by an oxygen-assisted reforming reaction stage.

DETAILED DESCRIPTION OF THE INVENTION

The process according to the present invention starts with providing a preheated gas mixture comprising a fossil fuel and steam. Under fossil fuel it is understood here carbon containing natural fuel material and particularly gaseous material such as natural gas, methane, ethane, propane, butane and mixtures containing said compounds. In the present invention, preferably natural gas or methane is used. Natural gas comprises mainly methane with typically 0-20% of higher hydrocarbons (primarily ethane). Under higher hydrocarbons it is meant hydrocarbons having at least 2 carbon atoms. Natural gas comprising high amounts of higher hydrocarbons, such as 5-15 vol %, is also suitable in the present invention. Natural gas is supplied to the plant at battery limit, typically under gauge pressure of up to 25 bar, preferably in the range 10-15 bar. In an alternative embodiment, the fossil fuel comprises 85-95 vol % of methane.

The gas mixture needs to be preheated because the following pre-reforming step is conducted under adiabatic conditions. The inlet temperature of the gas mixture is preferably at least 300° C. and up to 600° C., and preferably in the range 350-550° C. More preferably, the inlet temperature of the gas mixture is in the range 400-500° C. In a preferred embodiment, the heat for preheating is supplied, at least partially, by a different process step in the same system, e.g. by a cooling step. In this way, the heat integration of the process scheme contributes further to the increase of thermal efficiency of the system.

Before the pre-reforming step, the fossil fuel can also be de-sulphurised in a hydrodesulphurisation section, which usually contains a catalytic converter for the hydrogenation of sulphur compounds to $H_2S$ and an adsorbent for $H_2S$, typically zinc oxide.

In the next step, the preheated mixture is fed into a pre-reformer, wherein an adiabatic reaction between the fossil fuel and the steam is conducted in the presence of a reforming catalyst, wherein a first reaction product mixture is formed comprising methane, hydrogen and carbon dioxide. In the pre-reformer, which is typically a catalytic fixed bed reactor operating adiabatically with nickel or cobalt based catalysts, the higher hydrocarbons are converted to methane and carbon oxides. The inlet temperature of the pre-reforming step is typically in the range from 300 to 600° C. and preferably from 400 to 500° C. The catalysts suitable in this reaction are known to a person skilled in the art and are, for example, those described in "Chemical Process Technology", Jacob A. Moulijn, Michiel Makkee, Annelies van Diepen (2001), John Wiley & Sons, Ltd. Suitable catalysts for the pre-reforming step comprise 30 wt. % to 50 wt. % of at least one metal selected from a group of nickel, cobalt and mixtures thereof, and a support comprising 50 wt. % to 70 wt. % of at least one of alumina and calcium aluminate. The catalyst may be promoted by potassium in a percentage from 0.5 wt. % to 3 wt. %.

The use of a pre-reformer offers numerous advantages, including: (i) reducing the possibility of coke formation on the main reformer catalyst by converting most of the heavier hydrocarbons present in the feed stream; (ii) reducing the load on the main reformer catalyst by converting a part of the methane present in the feed stream; (iii) reducing the ratio of steam to natural gas required for the reforming reaction; (iv) providing flexibility in processing natural gas feed from different sources; (v) preheating the gaseous feed mixture to a higher temperature prior to introducing it into the main reformer; (vi) increasing the life of both the reforming catalyst and tubes.

After the pre-reforming step, the first reaction product mixture is subjected to oxygen-assisted reforming (OAR) in the presence of a catalyst. It is essential to perform the oxidative reforming reaction in the presence of a catalyst, that is, within one reactor zone and not, as is generally common, using a conventional, two-zones ATR reactor, wherein the process is first carried out in the combustion (oxidation) zone without catalyst until typically all oxygen is consumed, and subsequently in a catalytic zone where reforming reactions without oxygen occur. Within one reactor zone means that the reaction of the pre-reformed feed with oxygen takes place directly in the presence of a catalyst and thus within a single reactor zone. This is in contrast to ATR reactors, which are multi-zone reactors wherein different zones have different conditions as to gas reagent composition, temperature, presence of catalyst, etc. An advantage of using OAR is that by introducing in the reforming feed mixture some oxygen amount directly inside the catalytic reactor the heat necessary to sustain the endothermicity of the steam reforming reactions is developed, thus allowing for the replacement of burners for the catalytic conversion reaction.

The employed OAR process can be distinguished from autothermal reforming (ATR) and catalytic partial oxidation (CPO). A difference between ATR and OAR is for example, as mentioned earlier, that an ATR reactor has a burner and the reaction takes place in 2 reactor zones with either oxygen or catalyst present, while the OAR takes place in one reactor zone wherein both oxygen and catalyst are present.

The differences between CPO and OAR are also known to a person skilled in the art. For example, the reaction conditions selected in CPO are usually such that predominantly CO is formed. A CPO reactor is typically fed with a lower amount of steam with typically an $H_2O/C$ molar ratio less than about 0.8. The OAR process uses higher ratios of $H_2O/C$. Typical ranges for $H_2O/C$ molar ratios in oxygen assisted reforming are 1.2-2.2, preferably 1.4-2.0, more preferably 1.6-1.9, for example around 1.8.

Considering the same consumption of $O_2$, in other words, the same molar feed ratio of $O_2/C$ of 0.54, the use of an OAR stage coupled with a WGS stage would assure an $H_2$ specific productivity of about 10% higher than that obtained with the scheme including the CPO followed by a WGS stage. In order to achieve the same $H_2$ specific productivity as the OAR, in the scheme using CPO an additional amount of steam needs to be added before the water gas shift stage, in order to well exploit this stage. The extra amount of steam needed can in this way be 25-45% higher when using the CPO followed by WGS than when using the OAR followed by WGS.

Another difference between OAR and CPO is that the outlet temperature of the OAR reactor is typically lower than the CPO. This is caused by the higher selectivity to methane combustion in CPO due to the lower amount of steam. On the whole this leads to a need for less expensive material for OAR compared to CPO.

The oxygen-assisted reforming step is preferably autothermal, which means that the reaction system is self-sustained in terms of heat. In case of autothermicity, the $O_2/C$ and $H_2O/C$ feed ratios are balanced in such a way that the heat developed during the oxidation reaction of a portion of the fuel is sufficient to provide the heat required for the reforming reaction of the remaining amount of fuel.

Typical catalysts to be employed in this step contain oxide carriers on which noble metals such as Rh, Ru, Ir, Pt and/or transition metals such as Ni, Fe, Co are deposited. The oxide carriers can consist of particles or monoliths with different geometrical forms such as foam or honeycomb shapes. Although it is possible to use air as an oxygen containing stream, it is particularly advantageous in the present invention to use oxygen streams comprising at least 40 vol % oxygen, such as enriched air or other oxygen containing mixtures. Preferably the stream comprises at least 60 vol %, more preferably at least 80 vol % and even more preferably at least 90 vol % oxygen. In a preferred embodiment, pure oxygen containing at least 95 vol %, preferably at least 99 vol % oxygen is used.

As a result of the oxygen-assisted reforming step according to the invention, a second reaction product mixture is formed comprising hydrogen and carbon monoxide is formed, also called synthesis gas (syngas). This synthesis gas can be used as such, for example, directly supplied to a reactor for methanol synthesis or a Fischer-Tropsch process. It is however advantageous to use the synthesis gas further in order to produce hydrogen.

Therefore, in a preferred embodiment, the syngas mixture is cooled and subsequently fed to a water gas shift reactor. Preferably, the cooling is achieved by using a heat exchangers system where the recovered heat is used for raising the temperature of other process streams in the system, such as steam generation and/or the feed of the pre-reforming stage. After the heat recovery, the cooled effluent preferably has a temperature ranging from 200 to 500° C., more preferably from 250 to 450° C. The effluent is then fed to a catalytic water gas shift (WGS) reactor where carbon monoxide is converted to additional hydrogen and carbon dioxide.

In a preferred embodiment, at least a part of hydrogen from the second reaction product mixture is separated before the water gas shift reaction. This additional hydrogen separation would shift the equilibrium and increase the $H_2$ production. In another preferred embodiment, at least a part of hydrogen is separated from the gas mixture resulting from the water gas shift reaction. This hydrogen separation may be used as an alternative step to pressure swing adsorption (PSA), for example, when the hydrogen does not need to be extremely pure. In this embodiment membrane separation has an advantage that it is a continuous process versus using PSA which is a semi-continuous operation.

The WGS reaction is typically carried out using either a single stage or multi stage process to attain the desired degree and rate of conversion. In a multi stage process, the high temperature stage (HTS) operates at 300-450° C. and typically in the presence of an iron-based catalyst such as Fe/Cr. In the HTS the largest amount of CO is converted. In the following stage, medium or low temperature stage (MTS or LTS), the operating temperature is about 180-280° C. and typically a copper/zinc catalyst supported on alumina (Cu/Zn/Al) catalyst is used. Typical catalysts are selected from the group consisting of iron oxide, chromic oxide, cupric oxide, zinc oxide and mixture thereof. Other types of shift catalysts include copper supported on other transition metal oxides such as zirconia, zinc supported on transition metal oxides or refractory supports such as silica or alumina, supported platinum, supported rhenium, supported palladium, supported rhodium, and supported gold. The shift reaction is slightly exothermic and a portion of the heat is used in a second heat exchange zone to preheat the hydrocarbon feedstock flowing to the hydrodesulphurising reactor.

The gas stream resulting from the WGS reactor, being a third reaction product mixture, contains mainly hydrogen and carbon dioxide. This stream can be purified to obtain a purified hydrogen stream. The purified hydrogen stream preferably contains more than 90 vol %, more preferably more than 95 vol % hydrogen. Purification can be done, for example, by membrane separation or by pressure swing absorption (PSA) when high purity hydrogen is desired. In case PSA is used, the purified hydrogen stream preferably contains more than 99 vol % hydrogen.

Advantageously, the complete process of adiabatic pre-reforming followed by OAR and WGS can be operated at (i) low steam to carbon ratios, thus reducing the steam consumption and necessary energy consumption in operating the plant; (ii) higher gas hourly space velocity; and (iii) absence of burners for the catalytic conversion reaction, thus reducing the overall plant equipment sizes. The reason the typical steam reforming plants are large in size is due to a considerable physical distance between the reactor tubes and the burners in order to avoid damaging the reactor tubes by flame impingement. A typical distance can be 1-2 meters. The whole system is enclosed in a brick (lined) building which consequently becomes quite big. The present invention allows to considerably reduce the plant equipment size since no burners are used in the reforming part.

In another aspect, the present invention relates to a system suitable for hydrogen production from a hydrocarbon feed according to the invention, comprising a hydrodesulphurising unit (HDS) for removal of sulphur compounds from the hydrocarbon feed, which unit is coupled to an adiabatic pre-reformer for converting the desulphurised feed and steam into a first reaction product mixture comprising methane, hydrogen and carbon dioxide, which pre-reformer is coupled to a catalytic reactor for catalytic oxygen-assisted reforming of the first reaction product mixture, which catalytic reactor is also provided with an inlet for an oxygen comprising gas and an outlet for the resulting second reaction product mixture comprising hydrogen and carbon monoxide, wherein the catalytic reactor is coupled to a heat exchanger for cooling the synthesis gas, which heat exchanger is coupled to a water gas shift (WGS) reactor, which shift reactor has an outlet for a hydrogen comprising stream. Oxygen comprising gas can for example be air or oxygen enriched air. In case of air, said inlet of the catalytic reactor can be a simple air inlet. If enriched air is used, the inlet is typically coupled to a system producing enriched air.

In a preferred embodiment, the heat exchanger for cooling the second reaction product mixture is also used to heat up water for steam generation and/or the hydrocarbon feed entering the HDS unit. In this way, heat integration of the process scheme is achieved which further contributes to the increase of thermal efficiency of the system.

In another preferred embodiment, the system additionally comprises at least one membrane separation unit for hydrogen separation placed between the pre-reformer and the catalytic reactor and/or between the catalytic reactor and the WGS reactor and/or placed downstream of the WGS reactor. In yet another preferred embodiment, the system comprises two or more pre-reformers. Preferably, the system also comprises a PSA unit for purification of the hydrogen comprising stream, which PSA unit is placed downstream of the WGS reactor.

The present invention will further be described with respect to a particular embodiment and with reference to FIG. 1, but the invention is not limited thereto but only by the claims. Any reference signs in the claims shall not be construed as limiting the scope. The drawings described are only schematic and are non-limiting. Where the term "comprising" is used in the present description and claims, it does not exclude other elements or steps. Where an indefinite or definite article is used when referring to a singular noun, e.g., "a" or "an", "the", this includes a plural of that noun unless something else is specifically stated.

With reference to FIG. 1, the gaseous fossil fuel feed stream (1) is mixed with hydrogen recycle (2) and preheated (3) and then enters the hydrodesulphurising (HDS) reactor to remove sulphur compounds to a content lower than 10 ppm, preferably below 0.1 ppm.

The desulphurised feed (4) is mixed with superheated steam (5) and further preheated (6), typically in a steam to carbon ratio ranging from 1 to 6, preferably from 2 to 4, and fed (7) to a catalytic pre-reforming stage at a temperature ranging from 300 to 600° C., preferably from 400 to 500° C. Suitable catalysts for pre-reforming step are catalyst comprising 30 wt. % to 50 wt. % of at least one metal selected from a group consisting of nickel, cobalt and mixtures thereof, and a first support comprising 50 wt. % to 70 wt. % of at least one of alumina and calcium aluminate. The catalyst may be promoted by potassium in a percentage from 0.5 wt. % to 3 wt. %.

The effluent from the pre-reforming reactor (8), having a typical composition of about 31 vol % of $CH_4$, about 3 vol % of $CO_2$, about 7 vol % of $H_2$, about 59 vol % of $H_2O$ is at a temperature ranging from 250 to 550° C., preferably between 350 and 450° C., and is mixed with an oxygen rich mixture (9) available at a temperature ranging between 25 and 300° C., preferably between 100-200° C. and fed to the catalytic oxygen-assisted reforming reactor.

The oxygen-assisted reforming reactor may operate with a steam to carbon ratio in the range of 0.3-3.0, preferably in the range of 1.5 and 2.0 and with oxygen to carbon ratio in the range of 0.4-1.0, preferably in the range of 0.5-0.7. The syngas at the outlet of the oxygen-assisted reforming reactor (10) has a temperature in the range 800-1200° C., preferably between 900 and 1050° C. Typical catalysts to be employed in this stage contain oxide carriers on which noble metals such as Rh, Ru, Ir, Pt and/or transition metals such as Ni, Fe, Co are deposited. The oxide carriers can consist of particles or monoliths with different geometrical forms such as foam or honeycomb shapes.

The effluent from the catalytic oxygen-assisted reforming stage (10) typically contains less than 1 vol % of methane, about 13 vol % of carbon monoxide, about 42 vol % of hydrogen. Carbon dioxide and water form the balance. The effluent flows through a heat exchangers system where heat is recovered raising the temperature of the process streams such as generating of steam and the feed to the pre-reforming stage. After the heat recovery the cooled effluent (11), at a temperature ranging from 200 to 500° C., more preferably from 300 to 400° C., is fed to a catalytic water gas shift reactor where carbon monoxide is converted to additional hydrogen and carbon dioxide. The shift reaction is slightly exothermic and a portion of the heat is used in a second heat exchange zone to preheat the hydrocarbon feedstock flowing to the hydrodesulphurising reactor. A hydrogen rich mixture is obtained with a carbon monoxide content lower than 4 vol % and at the same time an increase of 23% in the hydrogen molar flow rate is reached in the water gas shift stage.

With respect to the traditional scheme employing a steam reforming reactor, the oxygen-assisted reforming reactor according to the present invention provides: (i) a decrease of 33% in steam consumption; (ii) a decrease from 6 to 22% in the specific consumption of natural gas (compared to a steam reforming reactor operating at an outlet temperature of 900 or 800° C.) and (iii) a reduction of 4% in specific $CO_2$ emission. Additionally, the presence of a pre-reforming unit before the oxygen-assisted reactor leads to a reduction of 2% in the oxygen consumption and of 3% in the specific consumption of natural gas.

The invention claimed is:
1. A process for producing a hydrogen containing gas mixture comprising the following steps:
(i) providing a preheated mixture comprising a fossil fuel and steam,
(ii) conducting an adiabatic reaction between the fossil fuel and the steam, in the presence of a catalyst, wherein a first reaction product mixture is formed comprising methane, hydrogen and carbon dioxide, and
(iii) mixing said first reaction product mixture with a gaseous oxygen-comprising stream to form a mixed stream and then conducting an oxygen-assisted reforming (OAR) reaction in a single OAR reaction zone between said first reaction product mixture and the gaseous oxygen comprising stream comprised in said mixed stream in the presence of a catalyst,
wherein the gaseous oxygen comprising stream comprises at least 40 vol % oxygen, and
wherein said OAR reaction zone has an outlet and wherein in said OAR reaction a second reaction product mixture is forming comprising hydrogen and carbon monoxide which is at a temperature of 800-1200° C. at said outlet of the OAR reaction zone, and
wherein steam is present in the OAR reaction such that the $H_2O/C$ molar ratio is in the range of 1.2 to 2.2 in said OAR reaction.
2. The process according to claim 1, further comprising the steps:

(iv) cooling the second reaction product mixture and subsequently feeding said mixture to a water gas shift reactor, and (v) conducting a water gas shift reaction wherein a third reaction product mixture is formed comprising hydrogen.

3. Process for hydrogen production comprising conducting a process according to claim 2, followed by purifying the third reaction product mixture to obtain a purified hydrogen stream.

4. The process according to claim 3, wherein the hydrogen purifying is performed by pressure swing adsorption or by membrane hydrogen separation.

5. The process according to claim 2, wherein the third reaction product mixture is routed to a reactor for ammonia synthesis.

6. The process according to claim 1, wherein the oxygen comprising stream comprises at least 90 vol % of oxygen.

7. The process according to claim 6, wherein the oxygen comprising stream comprises at least 95 vol % of oxygen.

8. The process according to claim 1, further comprising hydrogen separation from the second reaction product mixture.

9. The process according to claim 8, wherein said hydrogen separation is carried out using a membrane.

10. The process according to claim 1, where the fossil fuel is subjected to desulphurisation before step (i).

11. The process according to claim 1, wherein the second reaction product mixture is routed to a Fischer-Tropsch or methanol synthesis reactor.

12. The process of claim 1, wherein the fossil fuel is methane.

13. The process according to claim 1, wherein the oxygen to carbon ratio is 0.4-1.0 in said OAR reaction.

14. The process according to claim 1, wherein the catalyst is a monolith and the mixed stream is introduced directly into said monolith.

* * * * *